US008363261B1

(12) United States Patent
Zimmerman

(10) Patent No.: US 8,363,261 B1
(45) Date of Patent: Jan. 29, 2013

(54) METHODS, SOFTWARE, CIRCUITS AND APPARATUSES FOR DETECTING A MALFUNCTION IN AN IMAGING DEVICE

(75) Inventor: Gary D. Zimmerman, Garden Valley, ID (US)

(73) Assignee: Marvell International Ltd., Hamilton (BM)

( * ) Notice: Subject to any disclaimer, the term of this patent is extended or adjusted under 35 U.S.C. 154(b) by 626 days.

(21) Appl. No.: 12/539,473

(22) Filed: Aug. 11, 2009

Related U.S. Application Data

(60) Provisional application No. 61/088,503, filed on Aug. 13, 2008.

(51) Int. Cl.
*G06K 15/00* (2006.01)
*B41J 29/393* (2006.01)

(52) U.S. Cl. ..................... 358/1.18; 358/3.26; 358/1.13; 358/1.12; 358/504; 358/406; 399/15; 399/72; 347/9; 347/14; 347/19; 382/289

(58) Field of Classification Search .................. 358/504, 358/406, 1.18, 1.13, 1.14, 3.26, 1.12; 382/289, 382/287; 399/15, 9, 72; 347/19, 9–14
See application file for complete search history.

(56) References Cited

U.S. PATENT DOCUMENTS 5,534,895 A * 7/1996 Lindenfelser et al. .......... 347/19
6,666,600 B1 * 12/2003 Shirota et al. ................. 400/579
6,763,199 B2 * 7/2004 Conrow et al. ................. 399/15
6,764,156 B2 * 7/2004 Mantell ........................... 347/14
6,983,218 B2 * 1/2006 Ruiz et al. ...................... 702/151
7,052,125 B2 * 5/2006 Askren et al. ................. 347/103
7,334,859 B2 * 2/2008 Kojima ........................... 347/19
7,420,719 B2 * 9/2008 Mongeon ....................... 358/504
7,548,326 B2 * 6/2009 Fukushima .................. 358/1.12
7,556,337 B2 * 7/2009 Snyder ............................ 347/19
7,898,695 B1 * 3/2011 Damon et al. ............... 358/3.26
7,942,493 B2 * 5/2011 Watanabe ....................... 347/19
2005/0078133 A1 * 4/2005 Molinet et al. .................. 347/12
2010/0321433 A1 * 12/2010 Parish et al. .................... 347/12

* cited by examiner

*Primary Examiner* — Twyler Haskins
*Assistant Examiner* — Dennis Dicker

(57) ABSTRACT

Methods, software, circuits and apparatuses for detecting a malfunction in an imaging device. The methods generally comprise orienting an image at an angle on an image detecting device; detecting the image; determining an error in the image; and correlating the error to a malfunction in the imaging device. Software instructions can be adapted to determine an orientation angle of an image; analyze the image to detect an error; and calculate a location of a malfunction in the imaging device. The circuits generally include a memory element; logic configured to calculate the orientation of an image; a processor configured to analyze the image and locate a fault; and logic configured to determine a location of the fault in the image and correlate the fault to a malfunction in an imaging device. The present invention advantageously provides a lower cost technique for detecting a malfunction in a high resolution imaging device.

20 Claims, 10 Drawing Sheets

METHODS, SOFTWARE, CIRCUITS AND APPARATUSES FOR DETECTING A MALFUNCTION IN AN IMAGING DEVICE

RELATED APPLICATIONS

This application claims the benefit of U.S. Provisional Application No. 61/088,503, filed Aug. 13, 2008, incorporated herein by reference in its entirety.

FIELD OF THE INVENTION

The present invention generally relates to the field of imaging devices. More specifically, embodiments of the present invention relate to methods, software, circuits and apparatuses for detecting a malfunction in an imaging device.

BACKGROUND

Page-wide array (PWA) inkjet printers have a stationary print head with thousands of ink nozzles, often at resolutions as high as 1600 or 3200 dots per inch (dpi). Since the print head is stationary during printing, one cannot correct or compensate for an inoperative nozzle without first detecting the inoperative nozzle, and then taking measures to correct or compensate for the inoperative nozzle (e.g., by performing a nozzle flush or other print-head maintenance procedure). Therefore, it is critical that inoperative nozzles be detected so that corrective measures (e.g., dither patterns and/or other nozzle mapping or maintenance procedures) can be employed. These corrective measures, in general, should not be done proactively unless a nozzle is inoperative, as other print artifacts and/or print quality (PQ) reductions and/or print head life reductions could occur.

Some PWA inkjet printers can have a very high resolution optical sensor (e.g., a scanning head optical sensor) to monitor the output of the printer. Such optical sensors can identify inoperative nozzles. However, on lower cost, compact printers, the cost and size associated with such a high resolution optical sensor can be prohibitive. Many such lower cost printers (e.g., "all-in-one" type printers) have a low-cost flat bed or sheet-fed scanner of a lower resolution (e.g., 300 or 600 dpi) included as an integral part of the product.

FIG. 1 illustrates the above-described problem. An image comprising a continuous array of pixels 101, containing an error in the form of a column of missing pixels 103, is placed on a scanner. Scan bar 100, comprising scan sensors 102, has a resolution lower than that of the pixels 101 in the imaging device from which the image was produced. As a result, missing pixels 103 cannot be "seen" or detected individually by scan sensor 102*a* because scan sensor 102*a* detects adjacent pixel 101*a*. Similarly, scan sensor 102*b* cannot detect missing pixels 103 because scan sensor 102*b* detects adjacent pixel 101*b*. Accordingly, as shown, missing pixels 103 cannot be detected individually by either scan sensor 102*a* or adjacent scan sensor 102*b*. As scan bar 100 travels down the page from position P1 to P2 to P3, missing pixel 103*s* are not detected by any single scan sensor, irrespective of the position of scan bar 100.

Accordingly, the typical resolutions of low-cost scanners (e.g., 300 or 600 dpi) are generally too low to directly identify inoperative nozzles in an image produced by a PWA print head.

SUMMARY

Embodiments of the present invention relate to methods, software, circuits and apparatuses for detecting a malfunction in an imaging device. The methods generally comprise orienting a predetermined image (e.g., a test pattern) at an angle on an image detecting device; detecting the predetermined image with the image detecting device; determining a presence or absence of an error in the predetermined image; and correlating the error to a malfunction in the imaging device. The imaging device can comprise an inkjet printer, which can have a stationary print head. The image detecting device can comprise a scanner, and detecting the predetermined image can comprise scanning the predetermined image.

In general, the imaging device has a resolution greater than that of the image detecting device. In certain embodiments, determining the presence or absence of an error in the image comprises comparing a reference image and the predetermined image to determine a difference therebetween. In other embodiments, determining the presence or absence of an error in the predetermined image comprises comparing at least two parts of the predetermined image to determine a difference therebetween. Still further embodiments comprise correlating a location of an error in the predetermined image to a location in an imaging device that produced the predetermined image.

The software generally comprises a computer executable set of instructions encoded on a computer readable medium, the instructions adapted to detect a malfunction in an imaging device, comprising the steps of determining an orientation angle of an image; analyzing the image to detect an error therein; and calculating a location corresponding to a malfunction in the imaging device. In certain embodiments, the analyzing step includes comparing at least two parts of the image to determine a difference therebetween. Some embodiments also include the step of correlating a location of an error in the image to a location in an imaging device that produced the image.

The circuits generally comprise a memory element; logic configured to calculate the orientation angle of a detected image, the detected image being produced by an imaging device; an image analysis processor configured to analyze the detected image and locate a fault therein; and logic configured to determine a location of the fault in the detected image and correlate the fault location to a malfunction in the imaging device. In certain embodiments, the memory element is configured to store the detected image and a reference image. In other embodiments, the circuit includes logic configured to compare at least two parts of the detected image to determine a difference therebetween. In other embodiments, the detected image comprises a predetermined image (e.g., a test pattern), and the circuit can include logic configured to correlate a location of an error in a predetermined image to a location in the imaging device that produced the predetermined image.

The apparatuses generally comprise one or more embodiments of the circuit(s) described above, together with an imaging device and an image detecting device. In one implementation, the image detecting device comprises a scanner. In another implementation, the imaging device comprises an inkjet printer. In some cases, the inkjet printer can have a stationary head. Certain implementations further comprise a mechanism configured to orient the printed image relative to the image detecting device. In some embodiments, the imaging device has a resolution greater than that of the image detecting device.

The present invention advantageously provides a circuit, method and apparatus whereby a lower cost, relatively low resolution scanner (e.g., 300 dpi, 600 dpi or 1200 dpi) can be used to detect malfunctions (e.g., inoperative nozzles) in a relatively high resolution (e.g., 1600 dpi, 2400 dpi, 3200 dpi or greater) imaging device, such as a print head. These and other advantages of the present invention will become readily apparent from the detailed description of various embodiments below.

DETAILED DESCRIPTION

Figure 1:
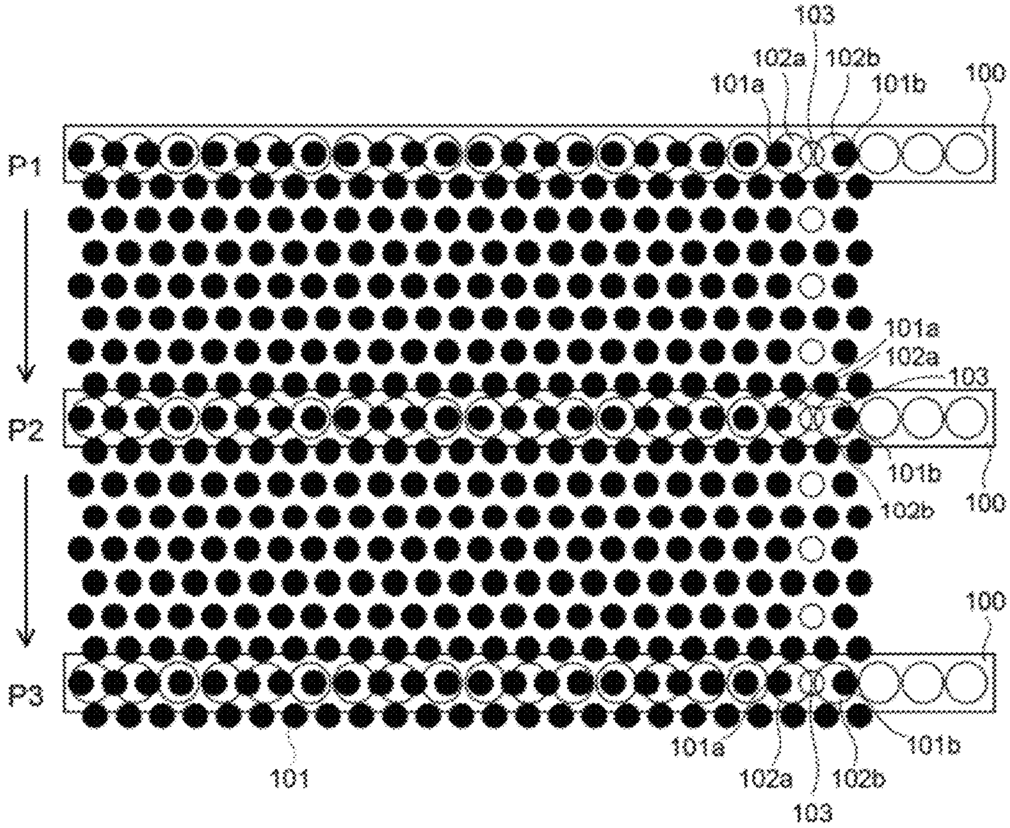
FIG. 1 is a diagram illustrating a typical problem detecting an error in a high resolution image with a low resolution scanner.

Reference will now be made in detail to various embodiments, examples of which are illustrated in the accompanying drawings. While the invention will be described in conjunction with the exemplary embodiments provided below, the embodiments are not intended to limit the invention. On the contrary, the invention is intended to cover alternatives, modifications and equivalents that can be included within the scope of the invention as defined by the appended claims. Furthermore, in the following detailed description, numerous specific details are set forth in order to provide a thorough understanding of the present invention. However, the present invention can be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on data bits, data streams or waveforms within a computer, processor, controller and/or memory. These descriptions and representations are generally used by those skilled in the data processing arts to effectively convey the substance of their work to others skilled in the art. A process, procedure, logic block, function, operation, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer, data processing system, or logic circuit. It has proven convenient at times, principally for reasons of common usage, to refer to these signals as bits, waves, waveforms, streams, values, elements, symbols, characters, terms, numbers, data, or the like.

All of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer, data processing system, logic circuit or similar processing device (e.g., an electrical, optical, or quantum computing or processing device), that manipulates and transforms data represented as physical (e.g., electronic) quantities. The terms refer to actions, operations and/or processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture. Furthermore, for the sake of convenience and simplicity, the terms "connected to," "coupled with," "coupled to," and "in communication with" (which terms also refer to direct and/or indirect relationships between the connected, coupled and/or communication elements unless the context of the term's use unambiguously indicates otherwise) can be used interchangeably, but these terms are generally given their art-recognized meanings.

The invention, in its various aspects, will be explained in greater detail below with regard to exemplary embodiments.

Exemplary Methods of Detecting an Error in an Imaging Device

In one aspect, the present invention relates to a method for detecting a malfunction in an imaging device. The method generally comprises orienting an image produced by the imaging device at an angle on an image detecting device; detecting the image with the image detecting device; determining the presence or absence of an error in the image; and, when an error is detected; correlating the error to a malfunction in the imaging device.

Figure 2:
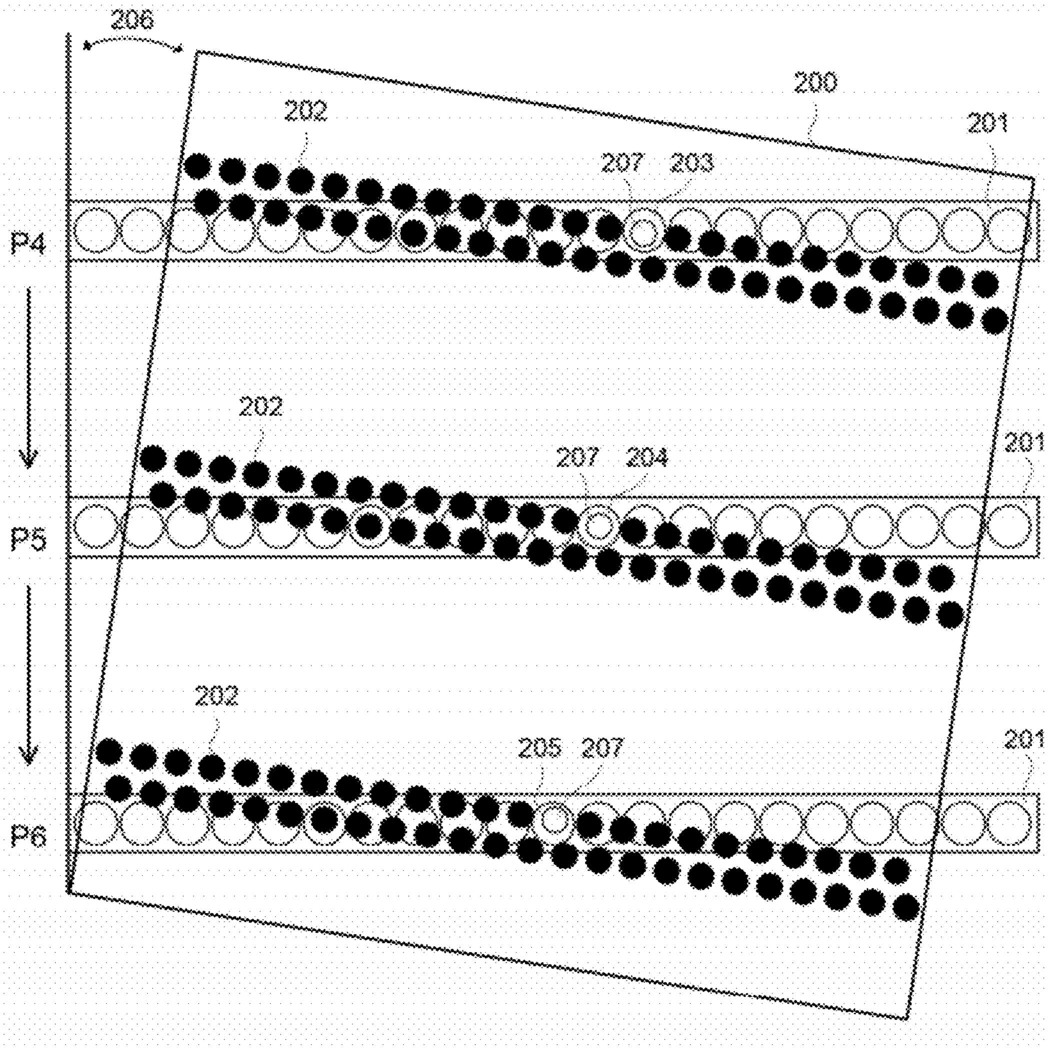
FIG. 2 is a diagram showing a first exemplary embodiment of the present method.

FIG. 2 illustrates an exemplary embodiment of the present methods. Substrate 200 has a predetermined image printed thereon, comprising rows consisting of pixels 202. Substrate 200 can be paper, or any other medium suitable for printing (e.g., plastic sheets, posterboard, etc.). The predetermined image can be a printed test pattern produced by the imaging device. The test pattern comprises individually printed pixels 202 in a predetermined pattern on the substrate 200. The individual pixels 202 can be any color printable by the imaging device and detectable by the image detecting device (e.g., cyan, magenta, yellow, red, blue, green and black inks, and combinations thereof).

The test pattern can comprise any number and/or color of printed pixels sufficient to detect a malfunction (e.g., a non-operating or mis-operating nozzle) in an imaging device. Essentially any predetermined arrangement of pixels will suffice, but an arrangement in which certain patterns are repeated (such as a series of repeated parallel vertical, horizontal and/or perpendicular lines with known spacing[s] between the lines) can be particularly useful. Some test patterns can comprise a continuous pattern of printed pixels. Alternatively, the printed pattern can comprise a series of lines comprising individual rows and/or columns of pixels on the substrate. The resolution of the test pattern can be, for example, 1600 dpi, 2400 dpi, 3200 dpi or greater.

Figure 3:
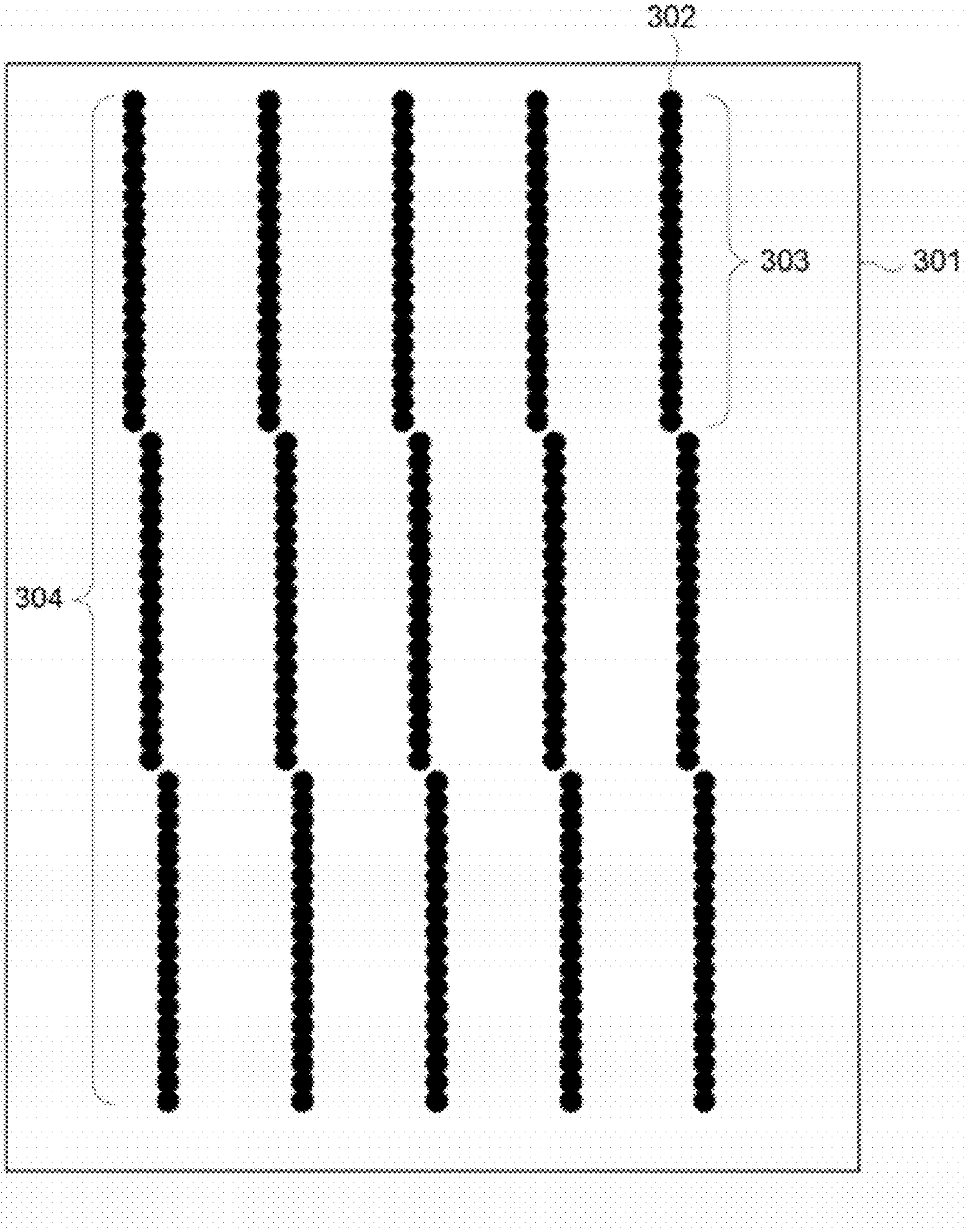
FIG. 3 is a diagram showing an exemplary embodiment of a predetermined image according to the present method.

For example, FIG. 3 illustrates an exemplary test pattern that can be employed in detecting an error in an imaging device according to the present methods. Substrate 301 has a test pattern printed thereon, comprising individual pixels 302. Pixels 302 are arranged in lines 303. Lines 303 are arranged such that, after a certain number of pixels are printed in a straight line, the line is "shifted" on the page by a fixed distance. Several lines 303 can be sequentially arranged to form pattern 304. The number of pixels and/or run length of lines 303 can be essentially any length sufficient to detect an error in the imaging device according to the present methods. Similarly, the number of lines 303 in pattern 304 can be essentially any number sufficient to detect an error an imaging device according to the present methods. Furthermore, while FIG. 3 illustrates an array of evenly spaced vertical lines, lines 303 can be arranged in essentially any orientation and/or spacing compatible with the present methods.

Individual lines are spaced at essentially any inter-line spacing that can be detected according to the present methods. Lines can comprise a single color, or any combination of colors that can be detected by an imaging detecting device. The lines can have any orientation (e.g., longitudinal, latitudinal, or at an angle) relative to a longitudinal axis described by the substrate on which the pattern is printed. The pattern can comprise essentially any number of lines (and individual pixels therein) sufficient to allow detection of an error in the pattern according to the present methods. The pattern can also comprise a combination of lines, individual pixels, and/or blocks comprising a continuous pattern of pixels. Standard test patterns used to evaluate print quality and imaging device performance, including standard test patterns printed by standard, commercially available inkjet and other printers, and as are otherwise known to those skilled in the art, can be used. The test pattern generally has a higher resolution relative to the resolution of the image detecting device.

In some embodiments of the present invention, the predetermined image or test pattern on substrate 200 is produced by an inkjet printer. The inkjet printer can comprise either a stationary or a moveable print head. In one embodiment, the imaging device is a PWA inkjet printer with a stationary print head. In typical embodiments, the resolution of the imaging device can be, for example, 1600 dpi, 2400 dpi, 3200 dpi or greater.

First, substrate 200 is placed on the image detecting device at an angle 206. The angle at which the predetermined image is oriented on the image detecting device can be essentially any angle, but the angle should not be so large as to project significant portions of the substrate and/or predetermined image on substrate 200 outside the detection area of the image detecting device. In some embodiments, the angle is less than 5°, 1°, 40', 20', or any other maximum value of less than 5°, although the invention is not so limited. The angle can be essentially any angle greater than zero compatible with the present method.

Substrate 200 is then detected by the image detecting device. The image detecting device can be essentially any device that can detect an image on a substrate and/or determine a color and/or intensity of an image on a pixel-by-pixel basis. In a typical implementation, the image detecting device is a scanner. In one embodiment, the scanner comprises a scan bar 201, containing a plurality of discrete scan sensors (e.g., including sensors 203, 204 and 205). The scan bar 201 moves in a continuous direction relative to substrate 200, generally such that the individual sensors (e.g., 203, 204, 205) move parallel to one another across the substrate 200. The resolution of the image detecting device is not particularly limited. In typical implementations, the resolution of the image detecting device can be, e.g., 300 dpi, 600 dpi, 1200 dpi, or any other resolution compatible with the present methods. However, the present invention is particularly suitable for embodiments in which the image detecting device has a lower resolution than the imaging device.

With substrate 200 oriented at angle 206, the test pattern on substrate 200 is then detected by scan bar 201. The lower resolution scanner comprising scan sensor 203 can now detect individual pixels, including missing pixel 207 in the higher resolution test pattern. The missing pixel 207 in the test pattern is a result of, for example, a single non-operational nozzle or pixel. As scan bar 201 moves from position P4 to position P5, the location of missing pixel 207 "shifts" as a result of the orientation of substrate 200 at angle 206. Thus, at position P5, scan sensor 204 now detects missing pixel 207. Similarly, at position P6, missing pixel 207 shifts again, and is now detected by scan sensor 205. This method of detecting missing pixel 207 works because a nozzle malfunction that produces missing pixel 207 will produce the missing pixel all the way down one column (e.g., at positions P4, P5 and P6) of the predetermined image. Since missing pixel 207 is reproduced in a predictable pattern on the substrate 200, missing pixel 207 can be sequentially detected at different locations in the scan bar path (e.g., P4, P5 and P6). Accordingly, the higher resolution predetermined image comprising pixels 202 on substrate 200 can be detected and analyzed by the lower resolution scan bar 201.

While it is possible to detect missing pixel 207 in a printed test pattern comprising very few printed rows and/or columns, in one implementation missing pixel 207 is detected in several locations (e.g., in several printed rows and/or columns) to improve the robustness and reliability of the present method. It can also be advantageous to detect missing pixel 207 at multiple locations in a printed image. This can afford a plurality of location data for missing pixel 207, and can assist in determining the location thereof, and consequently, locating a corresponding error in an imaging device.

The present method can also comprise determining the angle 206 from the detected image. The angle 206 can be determined from a comparison of the detected image scan data relative to a reference image. Alternatively, the predetermined image can comprise a register mark, fiducial, or other known pattern which can be detected by the image detecting device. Accordingly, the present method can further comprise determining the orientation of the predetermined image relative to the image detecting device (or relative to a line defined by the individual sensors in the image detecting device).

The presence or absence of an error in the detected image comprising pixels 202 can then be detected. In one embodiment, comparing at least two parts of the detected image can allow for identification of an error in the printed image. For example, scan lines detected at scan bar positions P4, P5, and P6 can be compared. Accounting for the angle 206 at which substrate 200 is oriented, scan bar data at multiple positions are compared to each other to detect an error in a printed test pattern (e.g., missing pixel 207). Data collected at scan bar positions P4, P5 and P6 can be also compared to predicted scan data based on a corresponding error free image (e.g., data corresponding to the printed test image, but without an error).

Figure 4A:
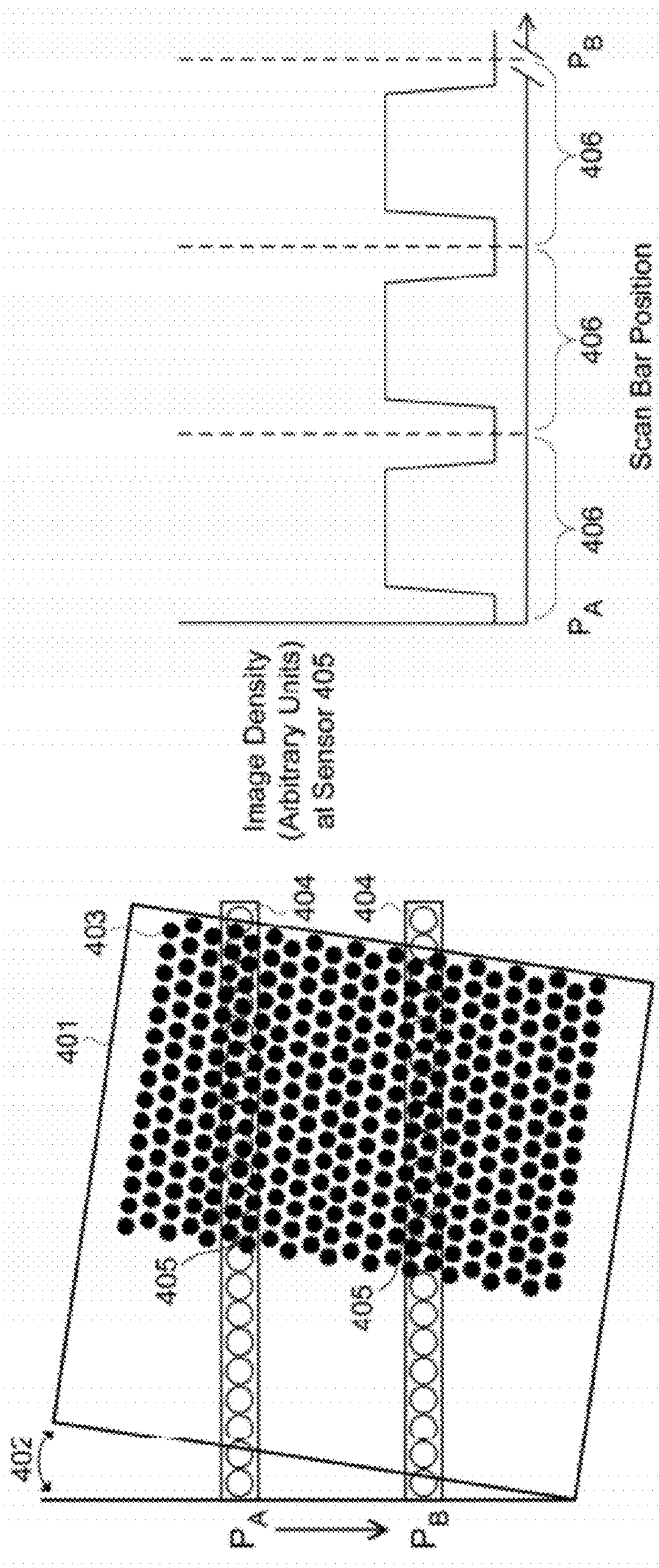
FIG. 4A is a diagram showing an exemplary implementation of the present method on an error-free image.

FIG. 4A shows an exemplary implementation of the present method on an error-free image. Substrate 401 has a test pattern comprising pixels 403, oriented at angle 402 relative to an image detecting device. In the present example, the test pattern comprises a regular, continuous array of pixels 403. The imaging device (e.g., a scanner) has a scan bar 404, comprising a plurality of individual scan sensors, including sensor 405. The resolution of pixels 403 is sufficiently high that no individual pixel can be detected individually by any single scan sensor. As scan bar 404 travels from position $P_A$ to position $P_B$ detecting pixels 403, sensor 405 detects the image comprising pixels 403. As shown in the accompanying plot of the image density detected by sensor 405 vs. scan bar position, scan sensor 405 detects pixels 403, and measures an image density represented by step function 406 (which can be periodic). As the scan bar 404 travels down the page, an image density response 406 repeats in response to the repeating pattern of pixels 403 in the predetermined image.

Figure 4B:
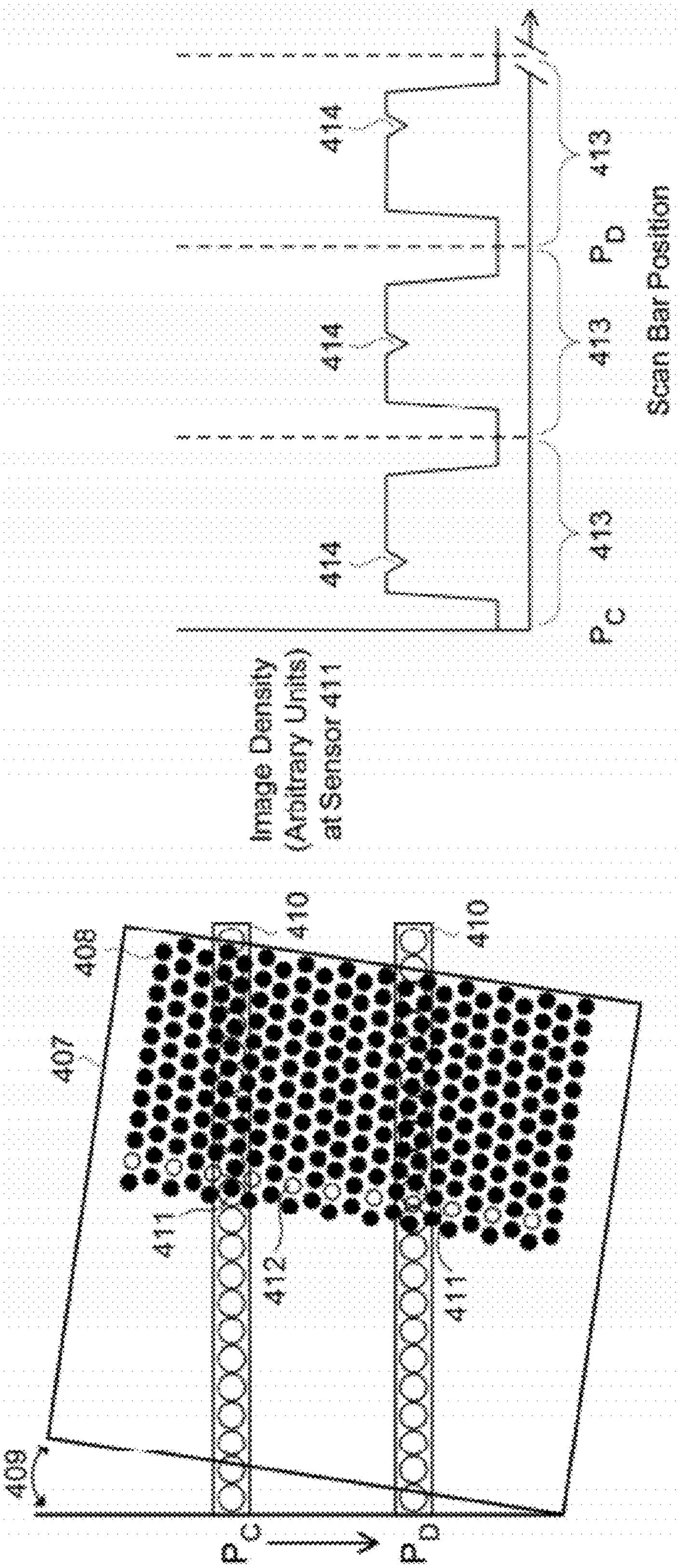
FIG. 4B is a diagram showing an exemplary implementation of the present method on an image produced by an imaging device with a malfunction.

FIG. 4B shows an exemplary implementation of the present method on an image produced by an imaging device similar to that shown in FIG. 4A, but with an error present in the form of missing pixels 412. The predetermined image comprises filled pixels 408 and missing pixels 412 on substrate 407. The missing pixels 412 correspond to a malfunction in the imaging device (e.g., an inoperative nozzle on a PWA inkjet printer having a stationary print head). Since the nozzle is stationary, missing pixel 412 is present in a regular pattern (i.e., every other pixel in a certain column) in the test pattern. As scan bar 410 comprising individual scan sensor 411 travels from position $P_c$ to position $P_D$, sensor 411 detects the image comprising filled pixels 408 and missing pixels 412. However, as sensor 411 passes over missing pixels 412, the detected image density is attenuated due to missing pixels 412. Accordingly, an attenuated response in portions of the step function 413 (at least as compared to step function 406) can be measured as "notch" 414. The attenuated segment or notch 414 shifts position along the plateau of the step function as a result of the angle at which the image is oriented. When scan sensor 411 travels past the column of missing pixels 412, the image density data then returns to an unattenuated response (e.g., step function 406 in FIG. 4A). Accordingly, image data (which can also be periodic or substantially periodic) from various parts of the test pattern can be compared to locate missing pixels 412 by detecting a discontinuity in the image density response (e.g., relative to a part of the image having an expected or ideal test pattern response). Alternatively, scan data of the printed test image containing missing pixels 412 can be compared to a predicted image density of a test pattern having no missing pixels therein, and a difference between the two can be identified and correlated to an error in the test pattern.

The present methods further comprise correlating an error in a detected predetermined image to a location of an error in an imaging device. Thus, according to the exemplary embodiment illustrated in FIGS. 2 and 4B, tracking the location of the discontinuity (e.g., missing pixels 207 or 407) as a function of the position of the scan sensors can give a reasonably accurate estimate of the orientation angle of the image relative to the image detecting device. The edge(s) of an image feature can be determined from the onset of detected image density (e.g., upward slope of the step function 413). The shift in position of an attenuated image density feature (e.g., notch 414) along a peak density maximum (e.g., the global maximum in step function 413) can be correlated with an error or discontinuity (e.g., a missing pixel) location. From some or all of these data, the angle at which the image is oriented relative to the image detecting device can be calculated or determined, as well as the location of the error in the non-angled image (e.g., test pattern). The pixel locations correlated to the edges of the image feature(s) are generally known in advance.

A determined location of an error in a printed image, and a determined orientation of the image relative to the image detecting device, can be used to determine a location on the imaging device responsible for the detected error (e.g., a nozzle assigned to print in that location). For example, according to the embodiment illustrated in FIG. 4B, when the test pattern is produced by printer with a stationary print head or otherwise fixed nozzle locations (e.g., a PWA inkjet printer), the location of each nozzle is generally known. The determined location of missing pixels 412 in an image comprising filled pixels 408 and missing pixels 412, the calculated orientation of the image, and the (generally) known locations of nozzles on the print head can be used to determine the location of the error on the imaging device (e.g., a misfiring or faulty nozzle) assigned to print missing pixels 312.

Exemplary Software

The present invention also includes algorithms, computer program(s) and/or software, implementable and/or executable in a general purpose computer or workstation equipped with a conventional digital signal processor, configured to perform one or more steps of the method(s) and/or one or more operations of the hardware. Thus, a further aspect of the invention relates to algorithms and/or software that implement the above method(s). For example, the invention can further relate to a computer program, computer-readable medium or waveform containing a set of instructions which, when executed by an appropriate processing device (e.g., a signal processing device, such as a microcontroller, microprocessor or DSP device), is configured to perform the above-described method and/or algorithm.

For example, the computer program can be on any kind of readable medium, and the computer-readable medium can comprise any medium that can be read by a processing device configured to read the medium and execute code stored thereon or therein, such as a floppy disk, CD-ROM, magnetic tape or hard disk drive. Such code can comprise object code, source code and/or binary code.

The waveform is generally configured for transmission through an appropriate medium, such as copper wire, a conventional twisted pair wireline, a conventional network cable, a conventional optical data transmission cable, or even air or a vacuum (e.g., outer space) for wireless signal transmissions. The waveform and/or code for implementing the present method(s) are generally digital, and are generally configured for processing by a conventional digital data processor (e.g., a microprocessor, microcontroller, or logic circuit such as a programmable gate array, programmable logic circuit/device or application-specific [integrated] circuit).

In various embodiments, the computer-readable medium or waveform comprises instructions to detect a malfunction in an imaging device, including instructions to determine an orientation angle of a predetermined image; analyze the image to detect an error therein; and calculate a location corresponding to a malfunction in the imaging device that produced the image.

Figure 5:
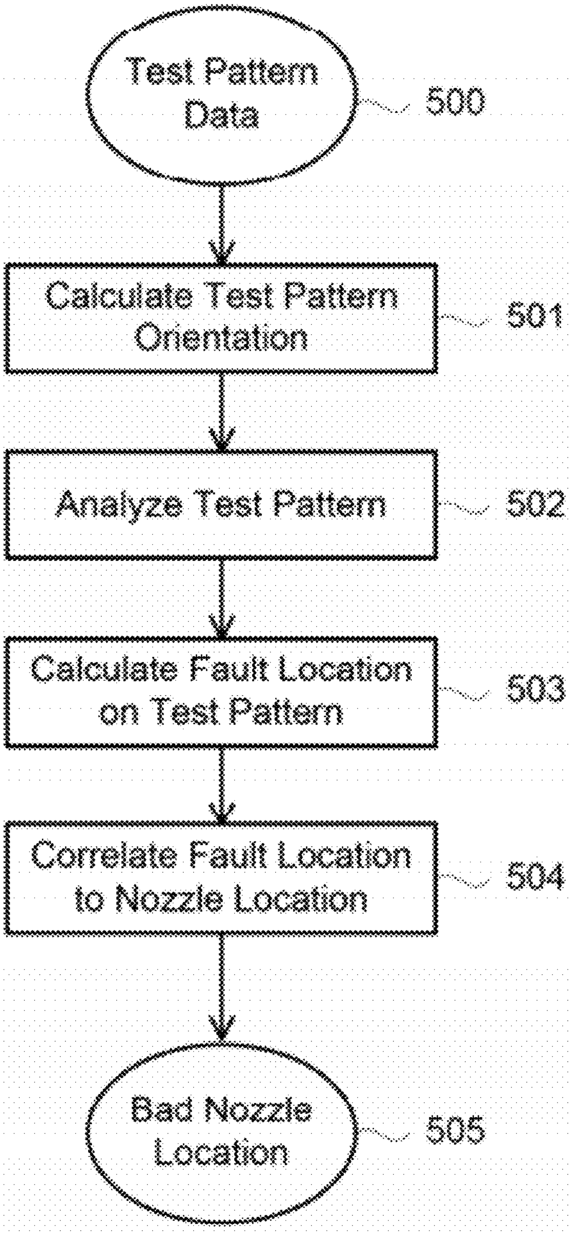
FIG. 5 is a flowchart embodying an exemplary method for detecting a malfunction in an imaging device.
Figure 9:
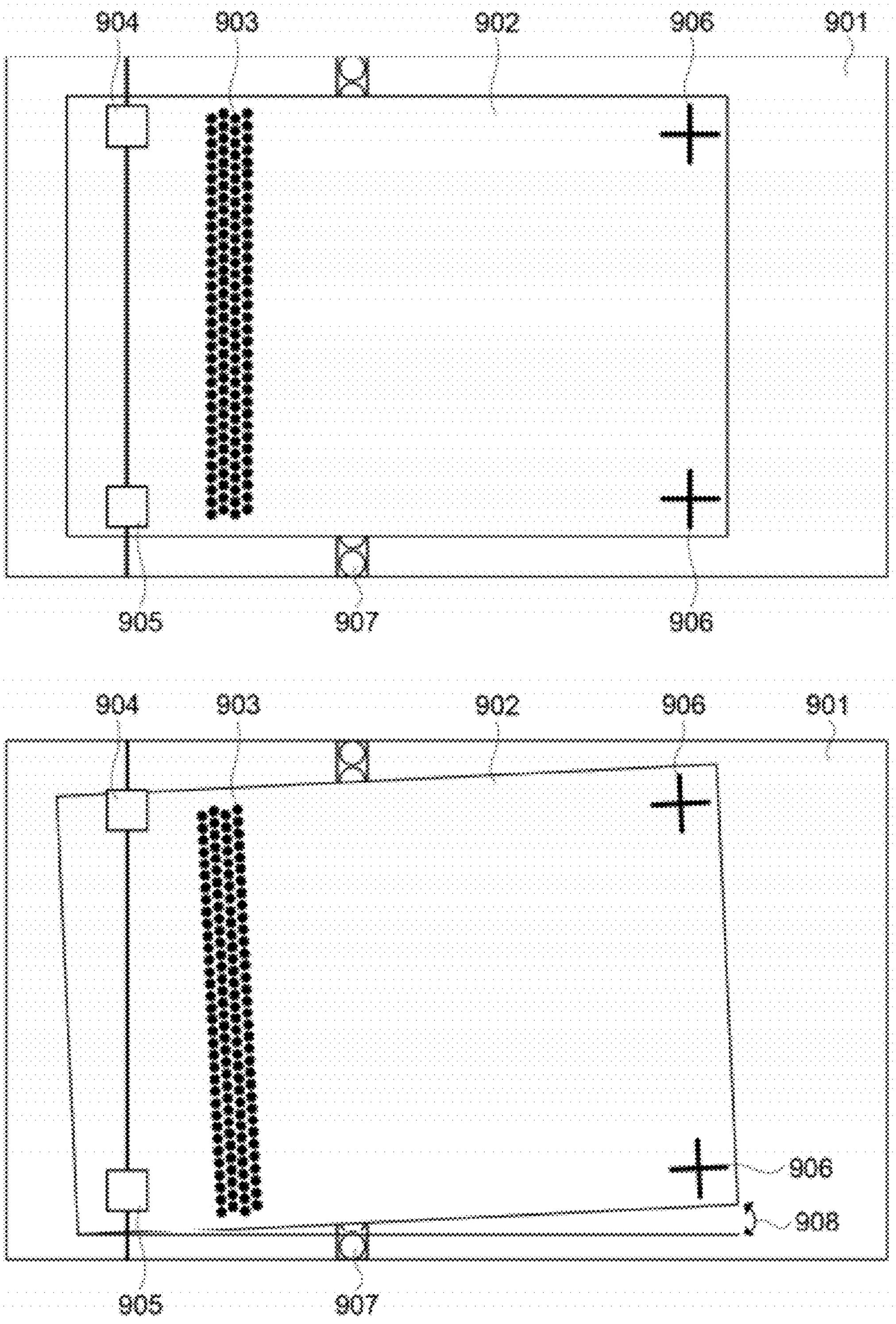
FIG. 9 is a diagram showing another exemplary implementation of the exemplary apparatus.

FIG. 5 is a flowchart embodying an exemplary method for detecting a malfunction in an imaging device. A predetermined image (e.g., a test pattern) is produced by an imaging device. The image is then detected affording test pattern data 500. The test pattern data is then processed in step 501 to determine an orientation of the image. As described above, such a determination can be made by comparison of the detected image data relative to reference image data. Alternatively, the predetermined image can comprise a register mark (e.g., register mark 906 as shown in FIG. 9) or other pattern which can be detected by the image detecting device. Logic and/or processors according to embodiments of the present invention can be employed to perform the calculations associated with determining an orientation angle of a predetermined image.

Test pattern data 500 is then analyzed in step 502 to determine if an error is present. As previously described, in some embodiments, determining the presence or absence of an error comprises comparing the detected image to a reference image. Alternatively, determining the presence or absence of an error can include comparing different parts of the detected image, and correlating differences therebetween to detect the presence or absence of an error in the detected image. For example, as described above in relation to FIG. 2, scan data collected at scan bar positions P4, P5 and P6 can be compared, and missing pixel 207 identified and located in each of the scan lines measured at each position. Such comparisons of different parts of the detected image (e.g., P4, P5 and P6) can provide multiple independent measurements of an error in an image, improving the reliability, accuracy, and/or robustness of the present methods. Methods and instructions for determining the presence or absence of an error can be combined to maximize efficiency and/or accuracy in a software and/or hardware implementation of the present methods.

If an error is detected, a location of the error is then calculated in step 503. The calculating step can comprise determining the location of a detected error in a printed predetermined image according to one or more embodiments as described herein. In a final step 504, the location of the error in the test pattern is then correlated to a location on the imaging device that produced the image containing the error. As described above, such an error can be located by correlating an error location in a detected image to, for example, a location of an inkjet nozzle assigned to print a pixel at the error location in the image.

The instructions described above can furnish a location of the detected error. An output of these instructions is, for example, a bad nozzle location 505. For example, referring again to FIG. 2, missing pixel 207 can be detected at scan bar positions P4, P5 and P6. Since the test pattern comprising pixels 202 and missing pixel 207 is produced (in this case) by a stationary print head, the relative location of each pixel is known. Furthermore, since the test pattern configuration is predetermined, and angle 206 can be determined, the geometric parameters to locate any pixel absolutely in the test pattern are known. Accordingly, the absolute location of each of the pixels 202 and missing pixel 207 in the test pattern can be correlated to an absolute location on the print head. Thus, detected missing pixel 207 can be directly correlated to a location of an error on the print head (e.g., a bad nozzle location).

The algorithm and/or software are generally configured to implement the present method and/or any process or sequence of steps embodying the inventive concepts described herein. The software generally comprises a computer executable set of instructions encoded on a computer readable medium, the instructions adapted to detect a malfunction in an imaging device.

Exemplary Circuits

In another aspect, the present invention relates to a circuit including a memory element; logic configured to calculate the orientation angle of a detected image produced by an imaging device; an image analysis processor configured to analyze the detected image and locate a fault therein; and logic configured to determine a location of the fault in the detected image and correlate the fault location to a malfunction in an imaging device.

Figure 6:
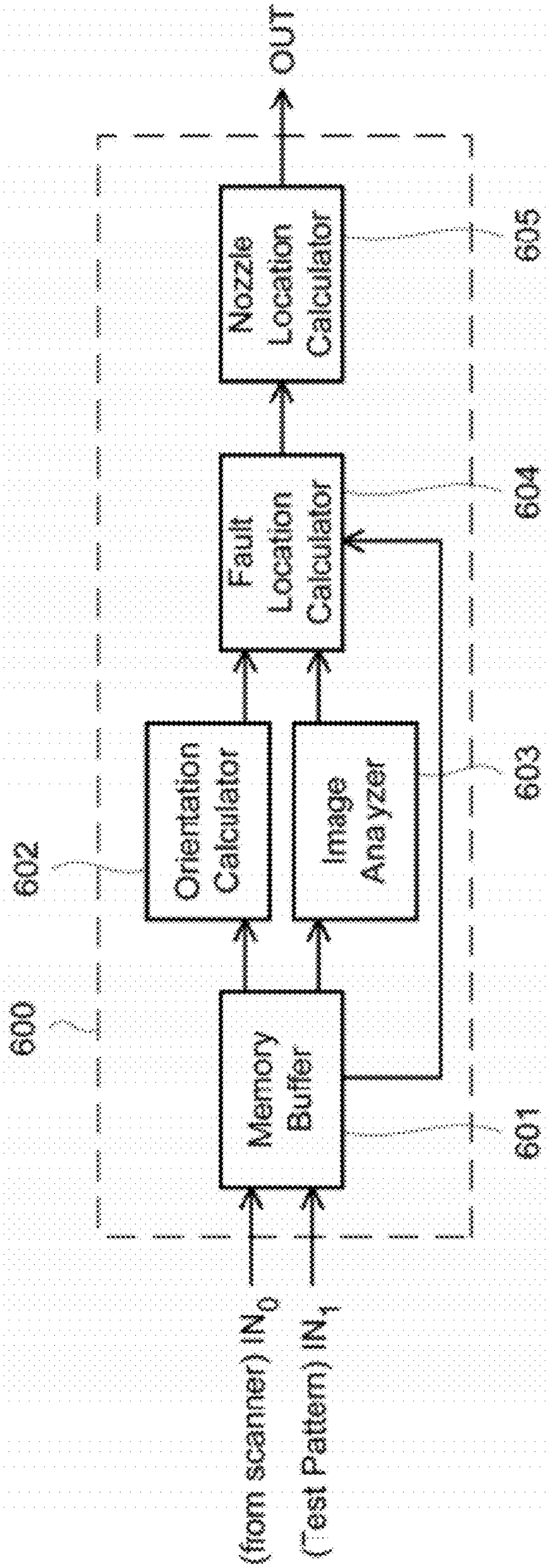
FIG. 6 is a diagram showing an exemplary circuit for detecting a malfunction in an imaging device.

FIG. 6 is a diagram showing an exemplary circuit for detecting a malfunction in an imaging device. A predetermined image produced by an imaging device (e.g., a test pattern comprising pixels in a predetermined pattern) is detected by an image detecting device. The data stream from the image detecting device (e.g., a scanner detecting the predetermined image) $IN_0$ is sent to and stored in memory buffer 601. Data describing the printed test pattern (e.g., those data and/or instructions that were sent to the imaging device to produce the predetermined image or test pattern) $IN_1$ is also sent to and stored in memory buffer 601. The detected image data $IN_0$ are then analyzed in orientation calculator 602 to determine the orientation of the scanned image. As described above, in some embodiments determining the orientation of the predetermined image comprises detecting a register mark, and calculating an orientation from the register mark. In other embodiments, determining the orientation of the printed predetermined image comprises calculating the orientation by comparing the detected image data to corresponding reference image data. The scanned image data can also be analyzed in image analyzer 603 according to any of the methods previously described, to determine the presence or absence of an error in the printed predetermined image. The image analysis processor can further comprise a comparator or logic configured to compare at least two parts of the detected image, and detect a difference between the parts of the detected image. In other implementations, the image analysis processor comprises a comparator or logic configured to compare the stored reference image and the detected image and detect a difference between the stored reference image and the detected image.

When image analyzer 603 detects the presence of an error (e.g., a missing pixel) in the scanned image, the outputs of orientation calculator 602 (e.g., a calculated orientation of the printed predetermined image) and image analyzer 603 (e.g., a location of an error in the printed predetermined image) are transmitted to fault location calculator 604. Data $IN_1$ describing the printed test pattern (e.g., those data and/or instructions that were sent to the imaging device to produce the predetermined image or test pattern) can also be sent from memory buffer 601 to fault location calculator 604. Fault location calculator 604 receives data outputs from circuit elements 601, 602 and 603, and processes the data to determine the location an error in the scanned image. Fault location calculator 604 can include logic configured to determine a location of in error on the detected image. Differences detected in comparisons between parts of the detected image, or between the detected image and a stored reference image, or a combination of the two methods, can be further processed by the location determining logic to locate an error in the detected image in accordance with the methods previously described.

The results of the calculations performed by fault location calculator 604 (e.g., a location of an error [e.g., a missing pixel] in the printed predetermined image) can then be used by nozzle location calculator 605. Nozzle location calculator 605 can include logic configured to correlate an error location in a detected image to a location of a malfunction (e.g., an inoperative inkjet nozzle) in the imaging device. Accordingly, an output OUT can be, e.g., one or more nozzle locations on the imaging device.

In general, at least a portion or all of certain embodiments of the invention can be implemented by encoding logic in hardware, firmware and/or software. While various embodiments of the invention can be implemented in image processing instructions, they can also be implemented in logic (e.g., circuitry). The variety of physical embodiments available to implement the invention is not particularly relevant.

Exemplary Apparatuses

A further aspect of the invention relates to an apparatus to detect a malfunction in an imaging device. The apparatus generally comprises an embodiment of the circuits described above, an imaging device and an image detecting device.

Figure 7:
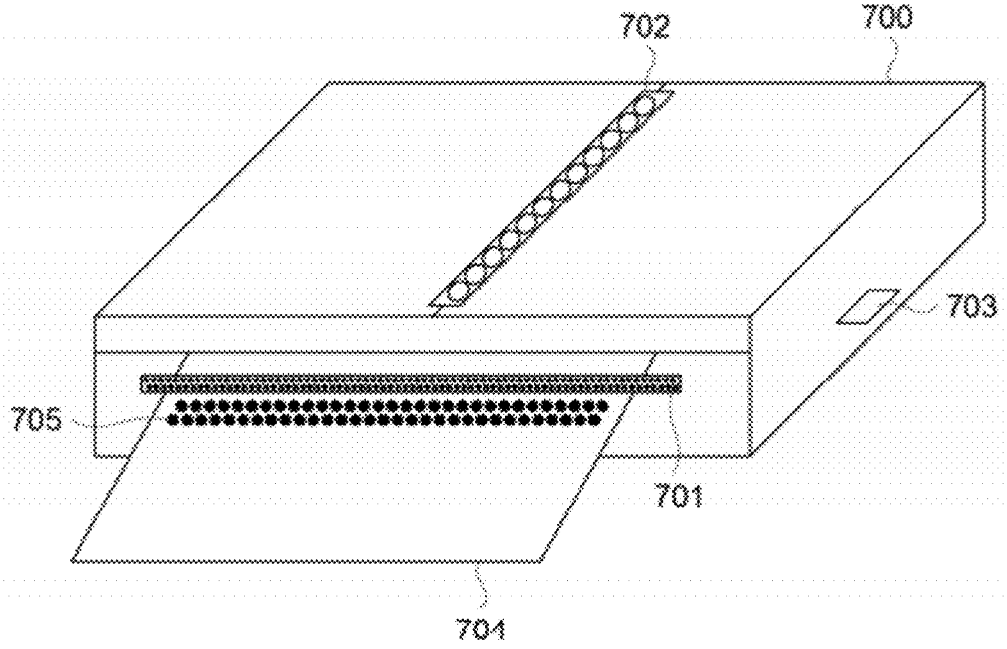
FIG. 7 is a diagram of an exemplary apparatus capable of implementing an exemplary method and/or incorporating an exemplary circuit.

FIG. 7 is a diagram of an exemplary apparatus capable of implementing an exemplary method and/or incorporating an exemplary circuit. An "all-in-one" type device 700 comprises an imaging device 701 (e.g., a PWA inkjet print head) having a multiplicity of printing elements (e.g., inkjet nozzles) therein. Device 700 also includes a scanner comprising scan bar 702, and a circuit 703 comprising logic and/or processors configured to implement one or more embodiments of the present methods and/or software. When a decline in print quality in images produced by imaging device 701 is detected (e.g., undesirable streaks and/or other irregularities in the printed image), a predetermined image (e.g., a test pattern) comprising pixels 705 are produced on substrate 704 by imaging device 701. The test pattern comprising pixels 705 are detected by scan bar 702. Scan data from detecting the printed test pattern comprising pixels 705 is processed by circuit 703 according to the any of above-described embodiments, and an error detected therein. A location of detected error in the printed test pattern (e.g., a missing pixel) is correlated to a location (e.g., a nozzle location) on imaging device 701 to locate an error in imaging device 701. Subsequent corrective measures and/or printer maintenance routines can be initiated to correct a detected error.

Figure 8:
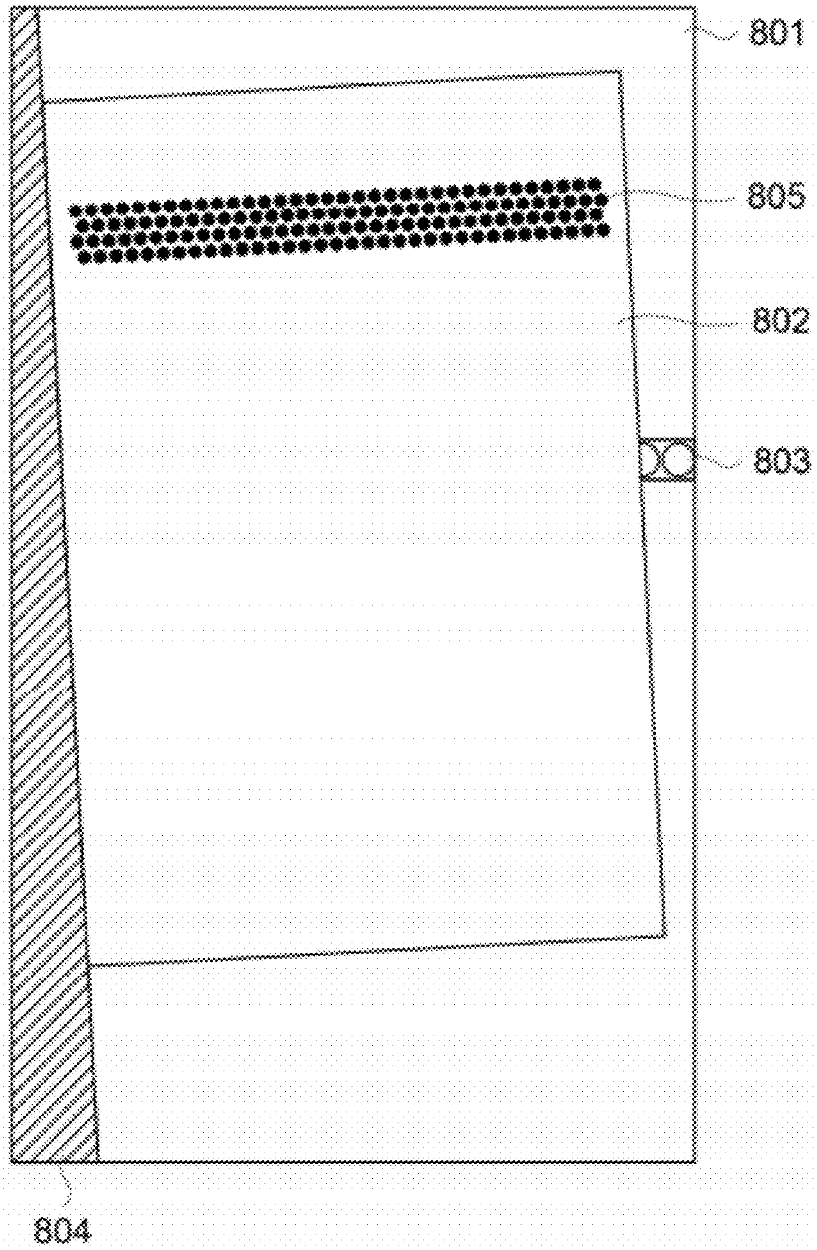
FIG. 8 is a diagram showing an exemplary implementation of the exemplary apparatus.

Some embodiments of the present apparatus can further comprise a mechanism configured to orient an image relative to an image detecting device. FIG. 8 is a diagram showing one implementation of such a mechanism in an exemplary apparatus. Substrate 802 (e.g., a sheet of paper) having a test pattern printed thereon comprising pixels 805, is placed on scanner 801. Scanner 801 comprises scan bar 803. A template 804 can be used to orient substrate 801 at a predetermined angle relative to the travel path of scan bar 803. Template 804 can orient the substrate at any suitable angle, as previously described. Template 804 can be made of essentially any suitable material such as, for example, plastic, ceramic, metal and/or cardboard or other firm/stiff paper stock.

Alternatively, a feeder, paper feed guide, or similar mechanism for aligning substrates on the surface of scanner 801 can be configured to have two or more settings, such as an "aligned" setting (i.e., in which the feeder enables feeding the substrate onto the scanner 801 at an orientation angle of substantially 0°) and an "angled" setting (i.e., in which the feeder enables feeding the substrate onto the scanner 801 at an orientation angle of greater than 0°, but less than or equal to about 5°, as described herein). In one implementation, the settings of such a variable feeder or feed guide are fixed using techniques known to those skilled in the art, and the value of the angled setting is included in the data used to determine the location of an error in a predetermined image or test pattern.

Many "all-in-one" type devices comprise roller-type mechanisms for feeding sheets onto a scanner bed. Accordingly, FIG. 9 illustrates another exemplary embodiment of the present apparatus. Device 901 comprises an exemplary mechanism employing such a roller-type mechanism to orient a substrate having a test pattern thereon. Substrate 902, having a printed test pattern 903 is placed on device 901. Placing substrate 902 on device 901 can comprise loading the substrate in, e.g., a sheet-feeding mechanism or other device, positioning substrate 902 in contact with rollers 904 and 905. Rollers 904 and 905 draw substrate 902 onto device 901, locating substrate 902 over a travel path of scan bar 907. Rollers 904 and 905 orient substrate 902 at an angle 908 relative to a travel path of scan bar 907. For example, in one embodiment, rollers 904 and 905 are rotated (e.g., in opposite directions) to skew substrate 902, orienting substrate 902 at an angle 908. Scan bar 907 detects test pattern 903 on substrate 902. In some embodiments, register marks 906 are detected by scan bar 907, and those scan data can be used to determine angle 908 after the image has been skewed by, for example, rotation of rollers 904 and 905. The detected image data is analyzed to determine the presence or an absence of an error as previously described.

CONCLUSION/SUMMARY

Thus, embodiments of the present disclosure provide methods, software, circuits and apparatuses for detecting a malfunction in an imaging device. In one aspect, inoperative printer elements (e.g., nozzles) are detected by scanning an image produced by a relatively high resolution imaging apparatus (e.g., print head) with a relatively low resolution image detecting apparatus (e.g., scanner). Embodiments of the present methods, software, circuits and apparatuses can be implemented using existing technology, at relatively little cost to the manufacturer, and ideally, at no or almost no cost to the consumer.

The foregoing descriptions of embodiments of the present disclosure have been presented for purposes of illustration and description. The embodiments described above are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for detecting a malfunction in an imaging device, the method comprising:

orienting a substrate at a non-zero angle relative to an image detecting device, wherein the substrate includes a predetermined image;

detecting the predetermined image using the image detecting device, wherein detecting the predetermined image includes determining a presence or absence of an error in the predetermined image, wherein the presence of an error is determined based on an error being oriented relative to the image detecting device at the non-zero angle at which the substrate is oriented relative to the image detecting device; and in response to an error being determined to be present in the predetermined image, correlating the error to the malfunction in the imaging device.

2. The method of claim 1, wherein the imaging device has a resolution greater than that of the image detecting device.

3. The method of claim 1, wherein the predetermined image comprises a test pattern.

4. The method of claim 1, wherein:

the image detecting device comprises a scanner; and detecting the predetermined image comprises scanning the predetermined image using the scanner.

5. The method of claim 1, wherein the imaging device comprises an inkjet printer.

6. The method of claim 5, wherein the inkjet printer has a stationary print head.

7. The method of claim 1, wherein determining a presence or absence of an error in the predetermined image comprises comparing a reference image to the predetermined image to determine a difference between the reference image and the predetermined image.

8. The method of claim 1, wherein determining a presence or absence of an error in the predetermined image comprises comparing at least two different parts of the predetermined image to two corresponding parts of a reference image.

9. The method of claim 1, further comprising correlating a location of the error to a location in the imaging device.

10. A non-transitory computer-readable storage medium comprising a computer-executable set of instructions encoded on the computer-readable storage medium, the computer-executable set of instructions adapted to perform the method of claim 1.

11. A non-transitory computer-readable storage medium comprising a computer-executable set of instructions encoded on the computer-readable storage medium, the computer-executable set of instructions comprising instructions for:

determining an orientation angle of a substrate relative to an image detecting device, wherein the substrate includes a predetermined image generated by an imaging device;

analyzing the predetermined image to detect whether an error is present in the predetermined image; and in response to an error being detected as being present in the predetermined image, calculating a location of a malfunction in the imaging device based at least on i) a location of the error in the predetermined image, and ii) the orientation angle of the substrate relative to the image detecting device.

12. The non-transitory computer-readable storage medium of claim 11, wherein the instructions for analyzing the predetermined image comprise instructions for comparing a reference image to the predetermined image to determine a difference between the reference image and the predetermined image.

13. The non-transitory computer-readable storage medium of claim 11, wherein the instructions for analyzing the predetermined image comprise instructions for comparing at least two parts of the predetermined image to two corresponding parts of a reference image.

14. The non-transitory computer-readable storage medium of claim 11, wherein the instructions for calculating a location of the malfunction in the imaging device comprise instructions for correlating the error in the predetermined image to a location in the imaging device.

15. A circuit for detecting a malfunction in an imaging device, the circuit comprising:

a memory element;

logic configured to calculate an orientation angle of a substrate relative to an image detecting device, the substrate having an image produced by the imaging device;

an image analysis processor configured to perform an analysis of the image to determine whether a fault is located in the image;

logic configured to, in response to a fault being determined to be located in the image based on the analysis, determine a location of the fault in the image; and logic configured to correlate the location of the fault to the malfunction in the imaging device based at least on the orientation angle of the substrate relative to the image detecting device.

16. The circuit of claim 15, wherein:

the memory element is configured to store the image and a reference image; and the image analysis processor is configured to, while performing the analysis of the image, compare the reference image to the image.

17. The circuit of claim 15, wherein the image analysis processor comprises a comparator configured to compare at least two different portions of the image to determine the fault location.

18. The circuit of claim 15, wherein the image analysis processor comprises a comparator configured to compare a reference image and the image to determine a difference between the reference image and the detected image.

19. The circuit of claim 18, wherein the difference corresponds to the fault location.

20. An apparatus, comprising:

the circuit of claim 15;

the imaging device; and the image detecting device.

* * * * *